United States Patent
de Jong et al.

(10) Patent No.: US 10,031,268 B2
(45) Date of Patent: Jul. 24, 2018

(54) BORDER STRUCTURES FOR DISPLAYS

(71) Applicant: Apple Inc., Cupertino, CA (US)

(72) Inventors: Erik G. de Jong, San Francisco, CA (US); Jean-Pierre S. Guillou, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/657,011

(22) Filed: Jul. 21, 2017

(65) Prior Publication Data

US 2017/0322357 A1 Nov. 9, 2017

Related U.S. Application Data

(63) Continuation of application No. 14/751,000, filed on Jun. 25, 2015.

(51) Int. Cl.
*G02B 5/22* (2006.01)
*G02B 5/30* (2006.01)

(52) U.S. Cl.
CPC ............ *G02B 5/223* (2013.01); *G02B 5/3025* (2013.01)

(58) Field of Classification Search
CPC ............ G09G 3/16; G09G 3/32; G09G 5/008; G09G 5/026
See application file for complete search history.

(56) References Cited

U.S. PATENT DOCUMENTS

| | | | |
|---|---|---|---|
| 7,473,924 B2 | 1/2009 | Millard et al. | |
| 8,169,132 B2 | 5/2012 | Oh et al. | |
| 8,537,311 B2 | 9/2013 | Fletcher et al. | |
| 8,716,932 B2 | 5/2014 | Rappoport et al. | |
| 8,994,677 B2 | 3/2015 | Poorter et al. | |
| 2004/0189196 A1* | 9/2004 | Cok | H01L 51/5281 313/512 |
| 2005/0168138 A1 | 8/2005 | Okunaka et al. | |
| 2006/0226422 A1 | 10/2006 | Millard et al. | |
| 2007/0228380 A1 | 10/2007 | Yoshinaga | |
| 2012/0106063 A1 | 5/2012 | Mathew et al. | |
| 2014/0001966 A1* | 1/2014 | Cho | H05B 37/00 315/161 |
| 2014/0027720 A1 | 1/2014 | Kim et al. | |
| 2014/0049522 A1* | 2/2014 | Mathew | H05B 33/0896 345/204 |
| 2015/0116639 A1 | 4/2015 | Chen et al. | |
| 2015/0216024 A1 | 7/2015 | Kwong | |
| 2016/0020261 A1* | 1/2016 | Kim | H01L 27/3227 362/235 |
| 2016/0365070 A1 | 12/2016 | Park et al. | |

* cited by examiner

*Primary Examiner* — Olga Merkoulova
(74) *Attorney, Agent, or Firm* — Treyz Law Group, P.C.; G. Victor Treyz; Zachary D. Hadd

(57) ABSTRACT

An organic light-emitting diode display may have an active area that contains pixels and an inactive area. The inactive area of the display may be provided with opaque masking layer structures having an appearance that matches the active area of the display when the pixels are off and are not displaying images. The opaque masking layer structures may include a polymer layer coated with a layer of metal. The display may have pixels with anodes and a cathode layer. The anodes may be formed from metal pads. Dummy structures such as a dummy cathode and dummy anodes may be formed in the inactive area. A circular polarizer in the display may overlap the active area and the inactive area or may overlap the active area without overlapping some or all of the inactive area.

21 Claims, 10 Drawing Sheets

BORDER STRUCTURES FOR DISPLAYS

This application is a continuation of U.S. patent application Ser. No. 14/751,000, filed on Jun. 25, 2015, which is hereby incorporated by reference herein in its entirety. This application claims the benefit of and claims priority to U.S. patent application Ser. No. 14/751,000, filed on Jun. 25, 2015.

BACKGROUND

This relates generally to electronic devices, and, more particularly, to displays for electronic devices.

Electronic devices such as cellular telephones, computers, and other electronic devices often contain displays. Organic light-emitting diode displays are thin displays that can be used to display color images for a user. The pixels in an organic light-emitting diode display each include a light-emitting diode having an anode and cathode. A circular polarizer layer may overlap that pixels to help suppress ambient light reflections from diodes.

Organic light-emitting diode displays have inactive border regions that contain display driver circuitry but do not contain any pixels. To block display driver circuitry in the inactive border regions and internal components in an electronic device from view, a display may be provided with a bezel that overlaps the border of the display. In some devices, the front surface of the display is covered with a protective cover glass layer.

The use of a bezel can be avoided by forming an opaque masking layer such as a layer of black ink on the underside of the cover glass layer along the edge of the display. When the display is off, the display will have a dark color. Although the black ink border also has a dark color, there can be a noticeable mismatch between the appearance of the black ink border and the dark color of the display. This mismatch may be aesthetically undesirable and distracting to the user.

It would therefore be desirable to be able to provide improved border structures for electronic device displays.

SUMMARY

A display such as an organic light-emitting diode display may have an active area that contains pixels that display images for a user. The display may also have an inactive area that does not contain any pixels and that does not display images for the user. The display may be mounted in a housing of an electronic device. A transparent display cover layer may be used as an outer layer of the display.

The inactive area of the display may be provided with opaque masking layer structures having an appearance that matches the active area of the display when the pixels are off and are not displaying images. The display may have an organic light-emitting diode display layer containing an array of the pixels. Opaque masking structures may be formed as part of the organic light-emitting diode display layer or may be formed as the structures that are attached to the display cover layer along the edge of the organic light-emitting diode display layer.

The opaque masking layer structures may include a polymer layer coated with a layer of metal. The organic light-emitting diode display may have pixels with anodes and a cathode layer. The anodes may be formed from metal pads. The anodes may be separated from the cathode layer by a polymer layer. A circular polarizer in the display may overlap display cover layer. The circular polarizer may overlap the active area and the inactive area or may overlap the active area without overlapping some or all of the inactive area. Dummy structures may be formed in the inactive area to ensure that the inactive area has an appearance matching that of the active area. The dummy structures may include a dummy cathode and dummy anodes that are formed respectively from portions of the cathode layer and the metal layer that forms the anodes.

DETAILED DESCRIPTION

Figure 1:
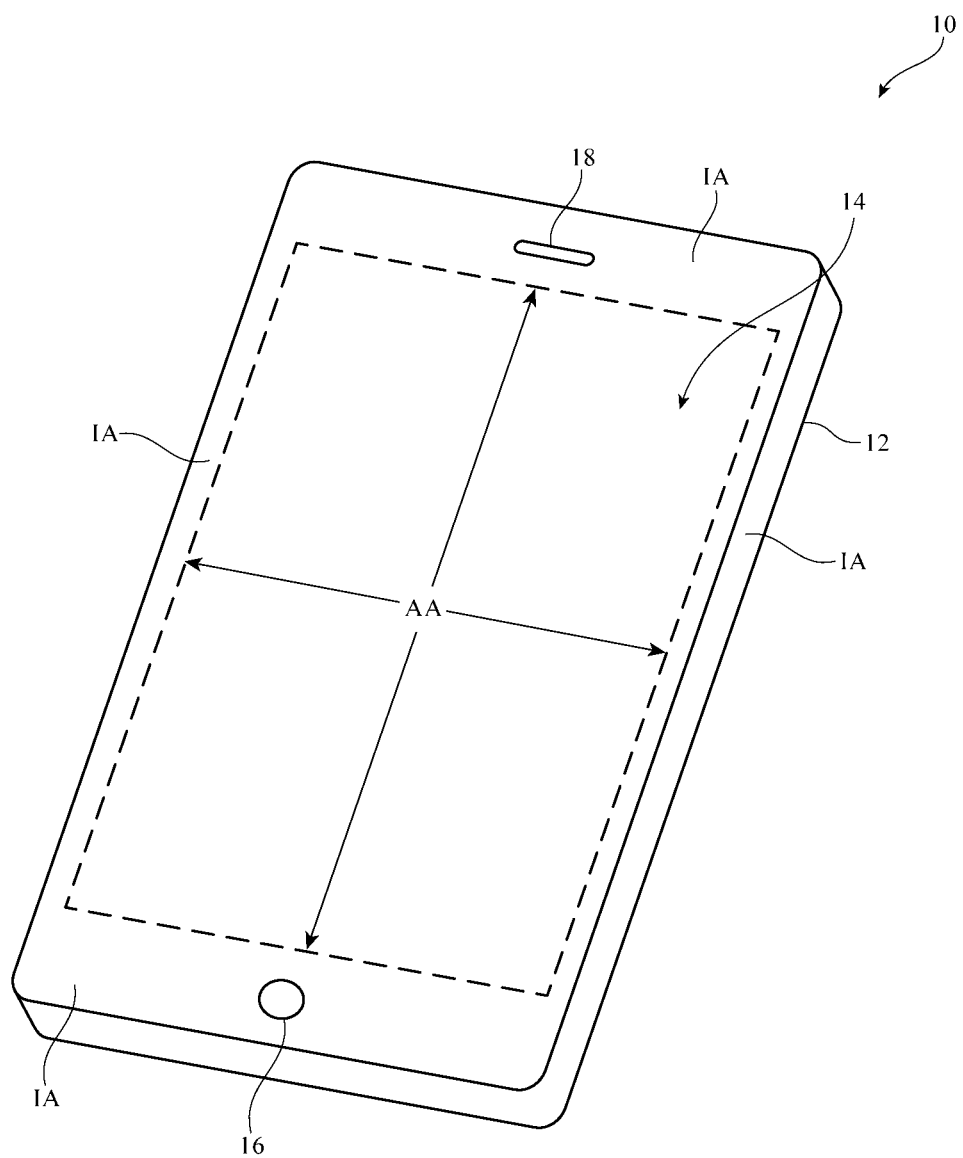
FIG. 1 is a perspective view of an illustrative electronic device in accordance with an embodiment.

An electronic device such as electronic device 10 of FIG. 1 may contain a display such as display 14. The display may have pixels organized in an array. The pixels may form an active area AA of the display that displays images for a user. Active area AA may have a rectangular shape or other shapes (e.g., area AA may be circular, rectangular with rounded corners, elliptical, etc.). An inactive border area IA in which no pixels are present may run along one or more of the edges of the active area. For example, in a configuration in which active area AA has a rectangular shape, inactive area IA may have a rectangular ring shape that surrounds active area AA. Inactive border area IA may contain circuits, signal lines, and other structures that do not emit light for forming images.

Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, display 14 of device 10 is mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18. Openings may be formed in housing 12 to form communications ports (e.g., an audio jack port, a digital data port, etc.), to form openings for buttons, etc.

Display 14 may include an array of display pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies. Illustrative configurations for display 14 that are based on organic light-emitting diode displays are sometimes described herein as an example.

Figure 2:
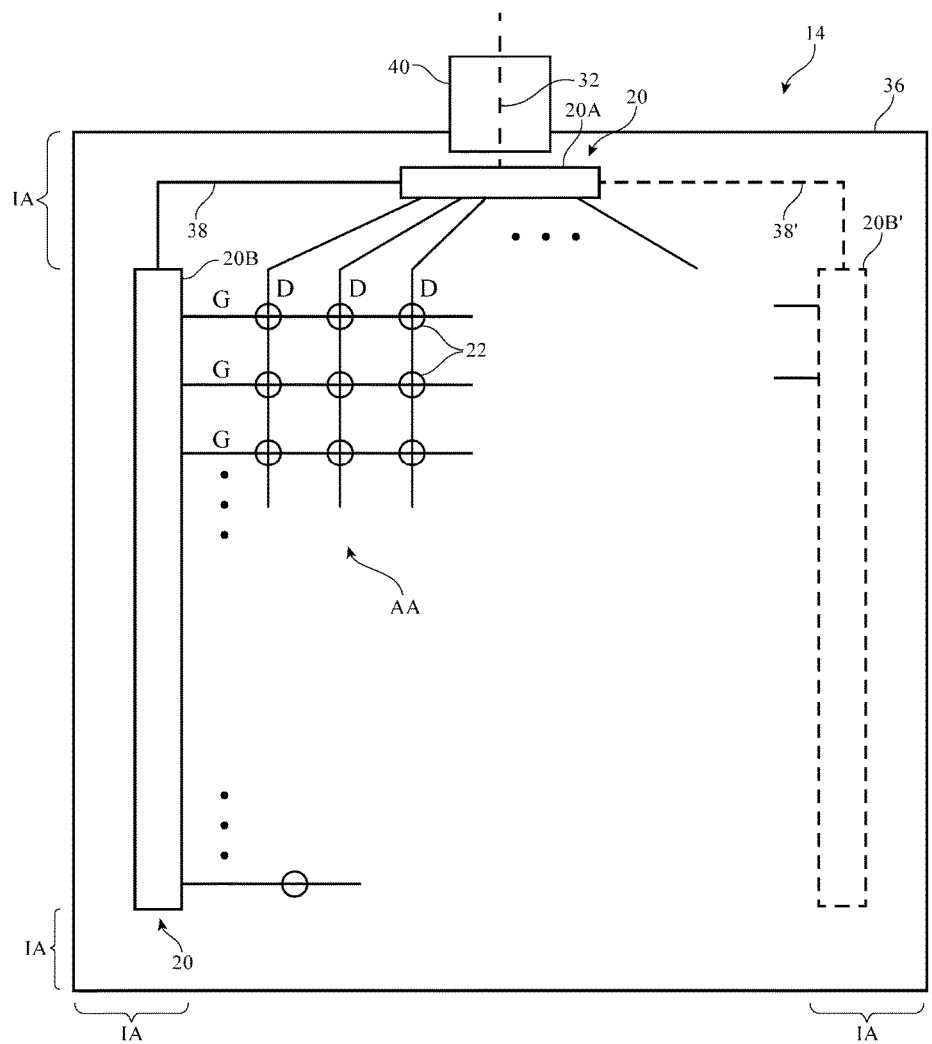
FIG. 2 is a top view of an illustrative electronic device display in accordance with an embodiment.

As shown in FIG. 2, display 14 may have rows and columns of pixels 22 that form active area AA. Active area AA is used to display images for a user of device 10. Pixels 22 may be formed using one or more layers of material such as substrate layer 36. Layers such a layer 36 may be formed from flexible polymers or other flexible materials (as examples). Substrate 36 may have left and right vertical edges and upper and lower horizontal edges. If desired, substrates such as substrate 36 may have non-rectangular shapes (e.g., shapes with curved edges, rectangular shapes and other shapes with protrusions that form flexible tails, etc.).

Each pixel 22 may have a light-emitting diode (e.g., an organic light-emitting diode). The light-emitting diode may have an anode (e.g., a metal pad), a cathode (e.g., a blanket transparent film formed from a transparent conductive material such as indium tin oxide and/or layers of metal that are sufficiently thin to be transparent), and organic emissive material interposed between the anode and cathode. Each of pixels 22 may also include thin-film circuitry (e.g., one or more thin-film transistors formed from polysilicon, indium gallium zinc oxide or other semiconducting oxides, or other semiconductors, thin-film capacitors, signal routing lines, etc.). The thin-film transistor circuitry and other circuits of display 14 may be used to apply control signals to the light-emitting diodes of pixels 22, thereby creating desired images on display 14.

Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). In organic light-emitting diode displays, pixels 22 contain pixel circuits that control the application of current to the light-emitting diodes of pixels 22. The pixel circuits in pixels 22 may contain thin-film transistors having gates that are controlled by signals on horizontal control lines such as lines G.

Display driver circuitry 20 may be used to control the operation of pixels 22. Display driver circuitry 20 may be formed from integrated circuits, thin-film transistor circuits, or other suitable circuitry. Thin-film transistor circuitry may be formed from polysilicon thin-film transistors, semiconducting-oxide thin-film transistors such as indium gallium zinc oxide transistors, or thin-film transistors formed from other semiconductors. Pixels 22 may have color filter elements of different colors (e.g., red, green, and blue) to provide display 14 with the ability to display color images.

Display driver circuitry 20 may include display driver circuits such as display driver circuit 20A and gate driver circuitry 20B. Display driver circuit 20A may be formed from one or more integrated circuits and/or thin-film transistor circuitry. Gate driver circuitry 20B may be formed from integrated circuits or may be thin-film circuitry. Display driver circuit 20A of FIG. 2 may contain communications circuitry for communicating with system control circuitry over path 32. Path 32 may be formed from traces on a flexible printed circuit such as flexible printed circuit 40 or other conductive lines. During operation, control circuitry in device 10 may supply circuit 20A with information on images to be displayed on display 14.

To display the images on display pixels 22, display driver circuitry 20A may supply image data to data lines D while issuing clock signals and other control signals to supporting display driver circuitry such as gate driver circuitry 20B over path 38. Circuitry 20A may supply signals to gate driver circuitry 20B on one or both edges of display 14 (see, e.g., path 38' and gate driver circuitry 20B' on the right-hand side of display 14 in the example of FIG. 2).

Gate driver circuitry 20B (sometimes referred to as horizontal control line control circuitry) may control horizontal control lines (gate lines) G. Gate lines G in display 14 may carry signals for controlling rows of pixels 22 (e.g., signals such as scan signals, emission control signals, etc.). The control signals in each row can be used to turn on transistors in pixels 22 in that row when loading data from the data lines into pixel storage capacitors in those pixels from data lines D). During operation, frames of image data may be displayed by asserting a signals on the rows of display 14 in sequence.

The portion of substrate 36 that contains the array of pixels 22 (i.e., active area AA) is used in displaying images for a user of device 10. The portion of substrate 36 that contains routing lines and supporting circuitry such as display driver circuitry 20 (i.e., the portion of substrate 36 in inactive area IA) does not contain any pixels 22 and therefore does not display images for device 10.

Figure 3:
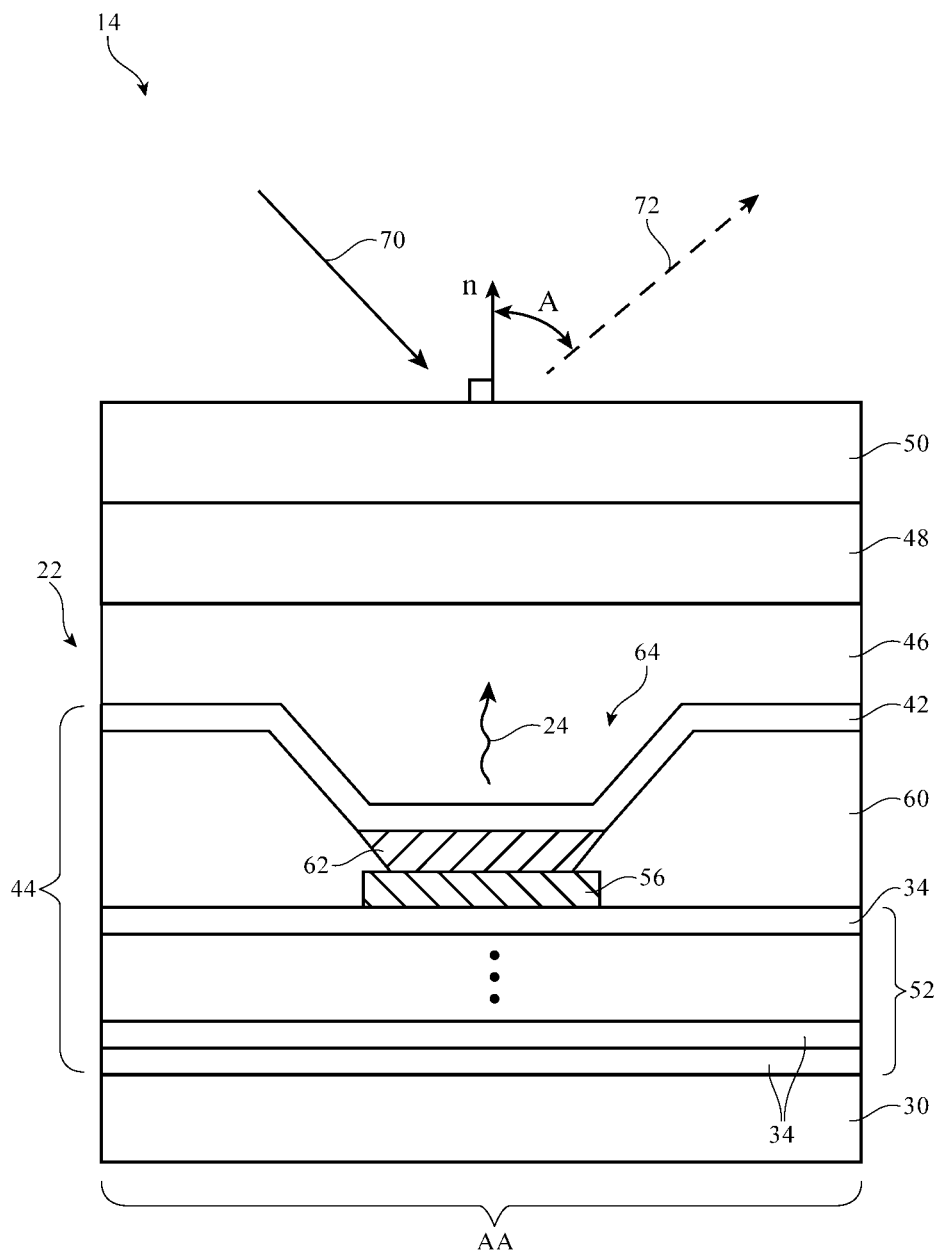
FIG. 3 is a cross-sectional side view of an illustrative organic light-emitting diode pixel in accordance with an embodiment.

A cross-sectional side view of a pixel 22 in active area AA in an illustrative organic light-emitting diode display is shown in FIG. 3. As shown in FIG. 3, display 14 may include a substrate layer such as substrate layer 30. Substrate 30 may be a planar layer or a non-planar layer and may be formed from plastic, glass, ceramic, sapphire, or other suitable materials. Configurations for display 14 in which substrate 30 is formed from a material such as plastic are sometimes described herein as an example.

Thin-film transistor circuitry 44 may be formed on substrate 30. Thin film transistor circuitry 44 may include anode structures such as anode 56 on thin-film layers 52. Layers 52 may include semiconductor layers, metal layers, and dielectric layers that form circuitry 44. Circuitry 44 may include transistors and capacitors that form pixel circuits for controlling light-emitting diodes such as light emitting diode 64 of FIG. 3. During operation, light-emitting diode 64 may emit light 24 for pixel 22.

Light-emitting diode 64 may be formed within an opening in pixel definition layer 60. Pixel definition layer 60 may be formed from a patterned photoimageable polymer. In each light-emitting diode, organic emissive material 62 is interposed between a respective anode 56 and cathode 42. Anodes 56 may be patterned from a layer of metal on circuitry 44. Cathode 42 may be formed from a common conductive layer that is deposited on top of pixel definition layer 60. Cathode 42 may be formed from a transparent conductive material such as indium tin oxide, one or more metal layers that are sufficiently thin to be transparent, or other conductive material that is transparent so that light 24 may exit light emitting diode 64. In some configurations, anode 56 may be formed above cathode 42 (i.e., the conductive layers for the terminals of the diodes 64 may be reversed). The configuration of FIG. 3 in which cathode layer 42 is located above anodes 56 is merely illustrative.

Display 14 may have a protective outer display layer such as display cover layer 50. The outer display layer may be formed from a material such as sapphire, glass, plastic, clear ceramic, or other transparent material. Configurations in which the outermost layer of display 14 is formed from a clear layer of glass are sometimes described herein as an example. This is merely illustrative. In general, the outermost layer of display 14 may be formed from any suitable material and may be formed with a thickness sufficient to provide display 14 with damage from scratches, etc. For example, display cover layer 50 may have a thickness of 0.05 to 2 mm, 0.1 to 0.5 mm, etc.

If desired, display 14 may include functional layers 48. Functional layers 48 may include a touch sensor layer, a circular polarizer layer, and other layers. A circular polarizer layer may help reduce light reflections from metal in thin-film transistor circuitry 44 such as cathode 42 and anodes 56.

Layer 46 may include one or more moisture barrier layers, polymer layers, adhesive layers, buffer layers, and other structures. Layer 46 may help planarize circuitry 44 and may sometimes be referred to as a planarization layer.

Layers of optically clear adhesive may be used to attach cover glass layer 50 and functional layers 48 to underlying display layers such as planarization layer 46, thin-film transistor circuitry 44, and substrate 30.

During operation of display 14, current is applied to light-emitting diodes 64 of pixels 22 in active area AA and active area AA displays images for a user of device 10. When display 14 is off, no current is applied to diodes 64, so no light 24 is emitted by pixels 22. Device 10 may be actively used by a user, even when display 14 is off. For example, a user of device 10 may listen to music with device 10, even though display 14 has been turned off to conserve power. When display 14 is off, ambient light in the vicinity of the user can strike the surface of display 14. As shown in FIG. 3, for example, ambient light 70 may illuminate display 14 and may reflect from display 14 at an angle A with respect to surface normal n to create reflected light 72.

Some conventional displays have display cover glass layers on which a ring of black ink is deposited to form an opaque border mask. The black ink mask in this type of arrangement does not have the same appearance as the display structures in the active area of the display, leading to a mismatch between the appearance of the border and the appearance of the active area. Black ink tends to be darker than the active area of the display and has an appearance that is relatively insensitive to the angle at which the black ink is being illuminated and viewed (see, e.g., angle A of FIG. 3). In contrast, the structures of the active area (e.g., the circular polarizer, planarization layer, cathode, anode, etc.) can lead to reflections and thin-film interference effects that vary from those of a black ink layer. As an example, the metal or other material forming cathode 42 (and anodes 62) may reflect non-negligible amounts of ambient light 70 from display 14 and thin-film interference effects may cause the color and intensity of the reflected light to vary significantly as a function of angle A. As a result, the black ink of conventional borders tends to be noticeably different in appearance than the active portion of the display that the conventional borders surround.

To reduce the difference in appearance between active area AA and border IA of device 10, device 10 can be provided with border structures that match the appearance of active area AA. The structures may be formed from extended portions of an organic light-emitting diode display (e.g., edge portions of structures formed on substrate 36 of FIG. 2), and/or may be formed from separate layers of material (e.g., structures formed on the underside of a display cover layer or on a substrate such as a polymer substrate that is attached to the underside of a display cover layer with adhesive).

Figure 4:
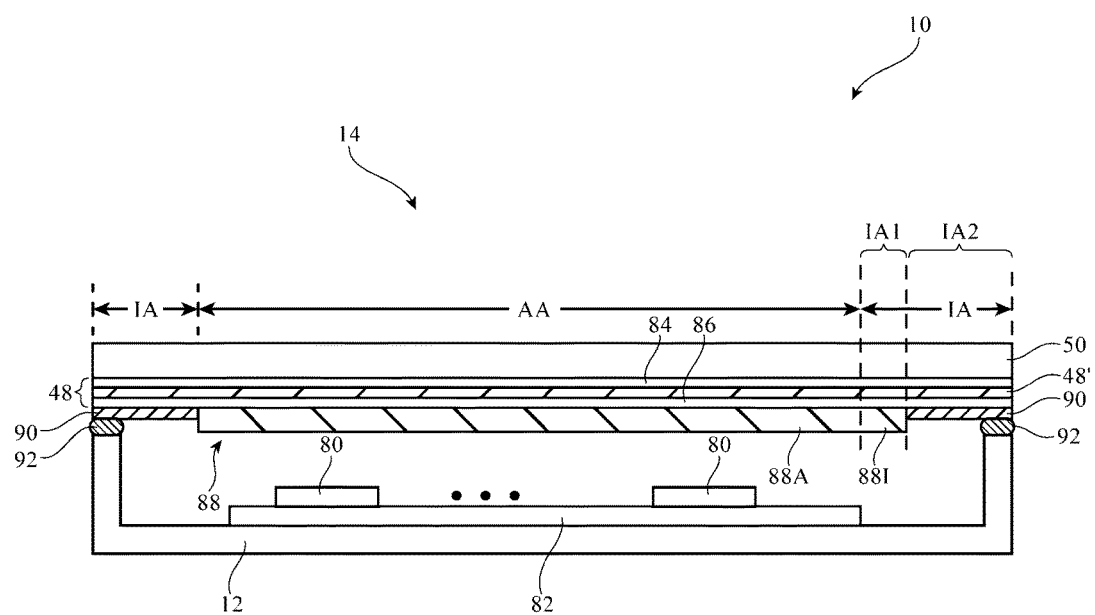
FIG. 4 is a cross-sectional side view of an illustrative electronic device in accordance with an embodiment.

Consider, as an example, the illustrative configuration of FIG. 4. FIG. 4 is a cross-sectional side view of device 10 in an illustrative configuration in which display 14 has been provided with separate opaque masking layer structures in inactive area IA that have an appearance that matches the appearance of active area AA. The cross-sectional view of FIG. 4 may, as an example, correspond to a cross-section of device 10 of FIG. 1 taken across the length of device 10. As shown in FIG. 4, device 10 may have a housing such as housing 12 in which components 80 are mounted. Components 80 may include integrated circuits, connectors, sensors, input-output devices, and other circuitry. Components 80 may be mounted on one or more substrates such as illustrative substrate 82. Substrate 82 may be a printed circuit (e.g., a rigid printed circuit board formed from fiberglass-filled epoxy or other rigid printed circuit board substrate material or a flexible printed circuit formed from a flexible layer of polyimide or a sheet of other polymer material).

Display 14 may have an organic light-emitting diode display layer such as display layer (display) 88. Display 88 may be, for example a flexible organic light-emitting diode display layer formed from a polyimide substrate layer or other suitable substrate (e.g., substrate 30 of FIG. 3) and may have pixels 22 such as pixel 22 of FIG. 3.

Display layer 88 may have an active area portion with pixels 22 (i.e., portion 88A in active area AA) and may have an inactive region that contains display driver circuitry 20 but that does not contain pixels 22 (i.e., portion 88I in inactive area portion IA1 of inactive area IA). The appearance of inactive portion 88I may match the appearance of active area portion 88A. Device 10 may also have opaque masking layer structures 90 with an appearance that matches portions 88A and 88I of display layer 88. Opaque masking layer structures 90 may be formed from one or more layers of material on a plastic substrate or other suitable support layer. Display 14 may be mounted to housing 12 using adhesive 92 or other suitable mounting arrangements.

Polarizer layer 48' in layers 48 may be attached to the underside of display cover layer 50 using adhesive layer 84 (e.g., optically clear adhesive). Display layer 88 and opaque masking layer structures 90 may be attached to the underside of polarizer layer 48' using adhesive layer 86 (e.g., an optically clear adhesive). If desired, other layers of material may be interposed within functional layers 48. The example of FIG. 4 is merely illustrative.

Polarizer layer 48' may be a circular polarizer to suppress light reflections from reflective structures (e.g., metal structures such as cathode and anode structures) in organic light-emitting diode layer 88. In the illustrative configuration of FIG. 4, polarizer layer 48' has a main rectangular portion in inactive area AA and has an extended edge that covers inactive area portion IA1 of inactive area IA and inactive area portion IA2 of active area IA. In portion IA1 of interactive area IA, polarizer layer 48' may suppress reflections from thin-film transistor structures in display driver circuitry 20 (e.g., metal traces). Polarizer layer 48' also helps ensure that the appearance of inactive area IA will be the same as that of active area AA. For example, the portion of polarizer layer 48' in portion IA2 of inactive area IA can help ensure that reflections and thin-film interference effects in inactive area IA match those of active area AA.

Figure 5:
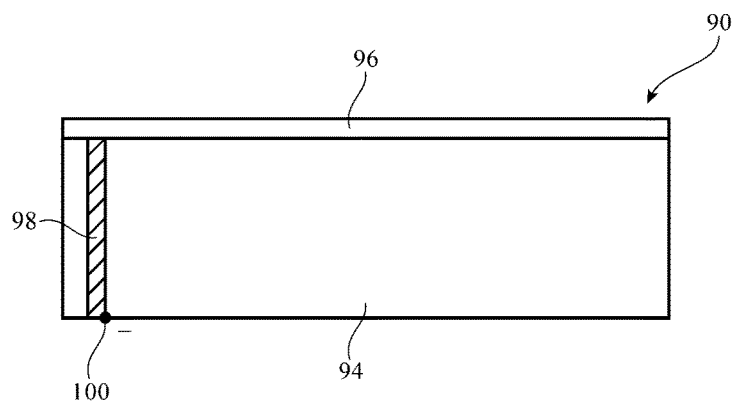
FIGS. 5, 6, and 7 are cross-sectional side views of illustrative opaque border structures in accordance with embodiments.
Figure 6:
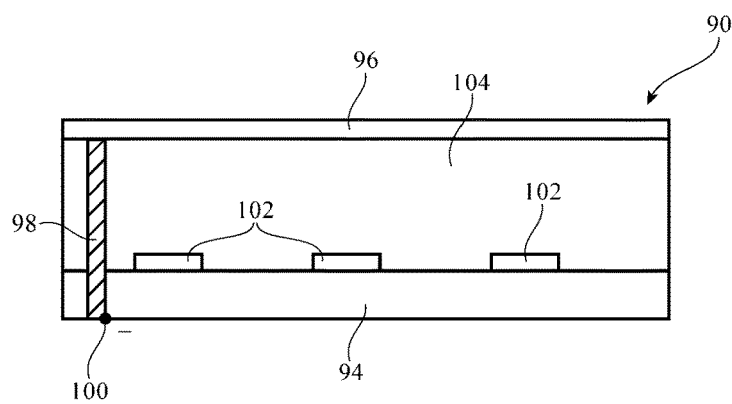
Figure 7:
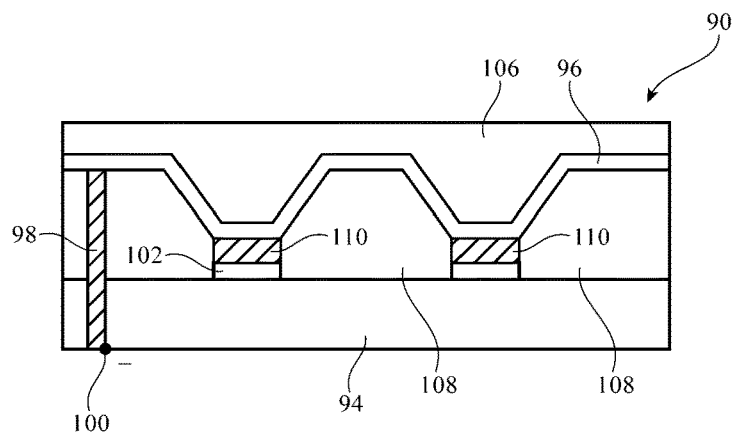

FIGS. 5, 6, and 7 are cross-sectional side views of illustrative embodiments of opaque masking layer structures 90. In the example of FIG. 5, structures 90 have a substrate layer such as layer 94 and one or more layers of material that are supported by layer 94 such as layer 96. Substrate layer 94 may be a polymer film or other suitable material (e.g., a dielectric layer, etc.). Layer 96 may be a metal coating having a reflectively that helps structure 90 exhibit the same appearance as active area AA of display layer 88. Layer 96 may be formed from a metal or other reflective material and may be formed from the same material that forms cathode 42 or a different material. Layer 96 may be a planar layer (e.g., a planar metal coating layer on polymer layer 94). In scenarios in which layer 90 includes metal such as metal coating layer 96, it may be desirable to ground metal layer 96 to a ground terminal (see, e.g., ground 100 of FIG. 5). Structures 90 may be formed with grounding paths such a grounding path 98 (e.g., a via) or other grounding paths may be used to ground metal layer 96 (e.g., paths formed from silver paint or other conductive paint, paths formed from conductive adhesive, paths formed from conductive gaskets, paths formed from conductive traces through display 88, and/or other suitable ground paths). The use of a via structure for forming path 98 is merely illustrative.

In the example of FIG. 6, structures 102 have been formed on substrate 94 and covered with layer 104. Layer 96 has been formed on layer 104. Layer 94 may be a substrate layer formed from a polymer or other material (e.g., a dielectric layer). The patterned structures of layer 102 may be metal structures (e.g., metal pads of the same size and thickness of anodes 56 of FIG. 3 or having different sizes and/or thicknesses). Layer 104 may be a polymer layer or a layer of other material (e.g., a layer of material with an index of refraction and/or other optical properties similar to that of layer 46 of FIG. 3 or other suitable layer of material). Layer 96 may be a metal layer or a layer of other material. Layers 94, 102, 104, and 96 may be configured so that the reflectivity and thin-film optical interference effects of structures 90 match those of layer 88 in active area AA. Optional vias or other structures may be used to form a grounding path such as path 98 to short layer 96 to ground terminal 100.

In the illustrative configuration of FIG. 7, structures 90 have a substrate layer such as layer 94 (e.g., a polymer layer or other layer such as a dielectric layer). Structures 102 such as metal pads may be formed on substrate 94. Material 110 may be formed on structures 102. Material 110 may be emissive material such as material 62 of FIG. 3 or may be material that has an index of refraction and/or other optical properties that match material 62. The material of layer 108 may have optical properties that match material 60 of FIG. 3. Layer 96 may be a metal layer or other layer of material that has optical properties that match those of layer 42 of FIG. 3. Layer 106 may serve as a planarization layer and may have optical properties that match those of planarization layer 46 of FIG. 3. Layers 94, 102, 110, 108, 96, and 106 are preferably configured so that the reflectivity and thin-film optical interference effects of structures 90 match those of layer 88 in active area AA. If desired, vias or other structures may be used to form a grounding path such as path 98 to short layer 96 to ground 100.

Figure 8:
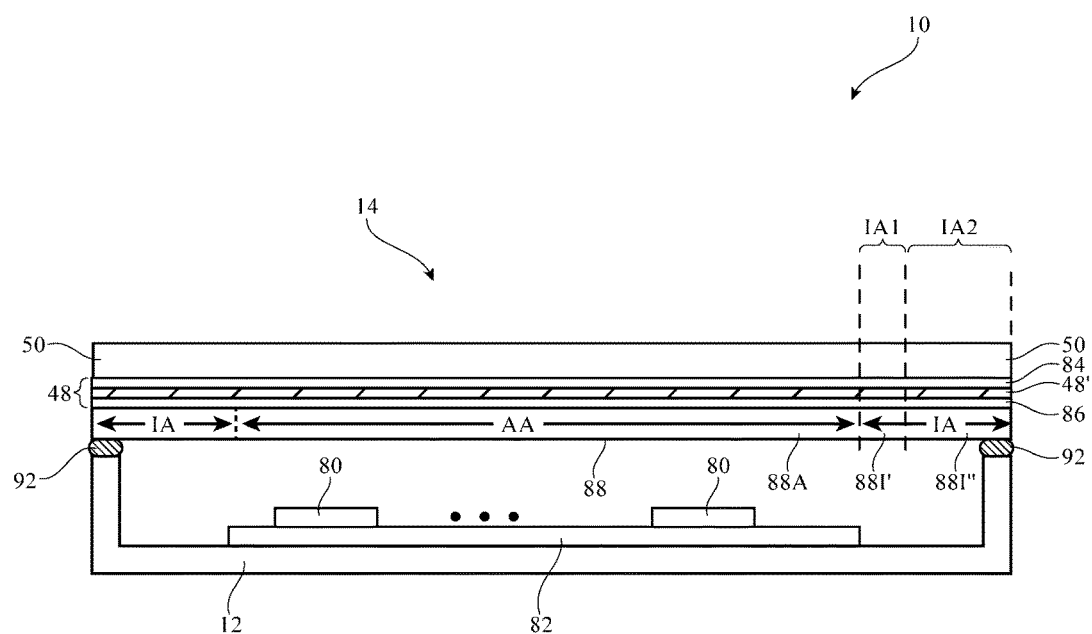
FIG. 8 is a cross-sectional side view of an illustrative electronic device having a display with a border in accordance with an embodiment.

FIG. 8 is a cross-sectional side view of device 10 showing another illustrative arrangement that may be used to ensure that inactive area IA has an appearance that matches that of active area AA. The cross-section of FIG. 8 is of the type that may be taken across the width of device 10 of FIG. 1 (as an example).

As shown in FIG. 8, display 14 may be mounted in housing using adhesive 92 (as an example). Display 14 may have a display cover layer such as display cover layer 50. Functional layers 48 may be interposed between organic light-emitting diode display layer 88 and display cover layer 50. Components 80 in the interior of device 10 may be mounted on one or more substrates such as substrate 82 (e.g., printed circuits, etc.). Polarizer layer 48' in layers 48 may overlap active display area AA and inactive display area IA to help ensure that inactive area IA has the same appearance as active area AA.

Organic light-emitting diode display layer 88 may have a central portion that contains pixels 22 and that forms active area AA of display 14. Organic light-emitting diode display layer 88 may also have an extended edge portion that is inactive and does not contain any pixels 22. The inactive edge of organic light-emitting diode display layer 88 may include edge portion 88' in portion IA1 of inactive area IA and edge portion 88" in portion IA2 of inactive area IA. Portion 88' of layer 88 may include display driver circuitry 20 (e.g., thin-film transistors for gate driver circuitry 20B, etc.) Portion 88" of layer 88 may include structures that help ensure that area IA has the same appearance as area AA (and may not contain any display driver circuitry). For example, portion 88" may have structures of the type shown in FIGS. 5, 6, and/or 7. The structures of FIGS. 5, 6, and 7 (e.g., metal and polymer layers, etc.) that are used in portion 88" may be formed from layers of material that are also present in portion 88A.

Figure 9:
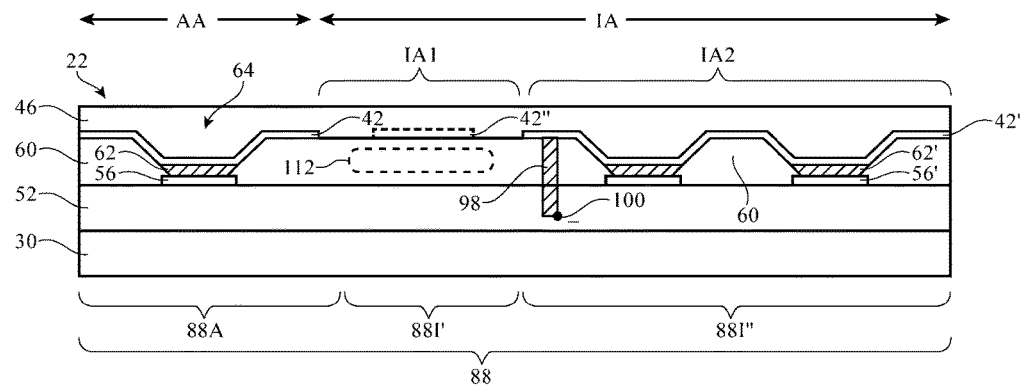
FIGS. 9 and 10 are cross-sectional side views of displays having borders in accordance with an embodiment.

FIG. 9 is a cross-sectional side view of organic light-emitting diode display layer 88 in an illustrative configuration in which inactive area IA2 has dummy pixel structures that help ensure that area IA2 has the appearance as active area portion 88A of layer 88. In portion 88A of display layer 88, layer 88 has substrate layer 30, layers 52, anode 56, emissive layer 62, cathode 42, and planarization layer 46. In extended edge portion 88I" of layer 88 (i.e., in inactive portion IA2 of inactive area IA), dummy structures such as dummy anodes 56', dummy emissive layers 62', and dummy cathode layer 42' ensure that the appearance of portion 88I" will match that of portion 88A (i.e., to form an opaque masking layer for the inactive area of display 14 that matches the appearance of the active area). Dummy anodes 56' may be patterned from the same layer of metal (or other material) that is used in forming anodes 56 for diodes 64 in pixels 22 of active area AA or may be formed from different materials. Similarly, dummy layers 62' and 42' may be formed from the same materials as respective layers 62 and 42 in active area AA or may be formed from different materials. Dummy anodes 56' may be formed on a dielectric layer in layers 52 (e.g., an organic or inorganic dielectric layer).

Portion IA1 of inactive area IA may contain circuitry 112 for forming display driver circuitry 20 and may optionally include a dummy cathode layer such as layer 42" (and/or dummy anodes such as dummy anodes 56') or other structures to help ensure that the appearance of region IA2 matches the appearance of active area AA. Conductive vias or other signal paths may be used to short dummy cathode 42' to ground 100, as illustrated by via 98, thereby preventing excess electrostatic charge from developing on dummy cathode 42' when device 10 is exposed to an electrostatic discharge event (e.g., when a user's finger contacts the edge of device 10 adjacent to dummy cathode 42'). Dummy cathode 42' may be formed from part of the same metal layer or other conductive layer that forms cathode 42 and may, if desired, be electrically isolated from cathode 42'.

Figure 10:
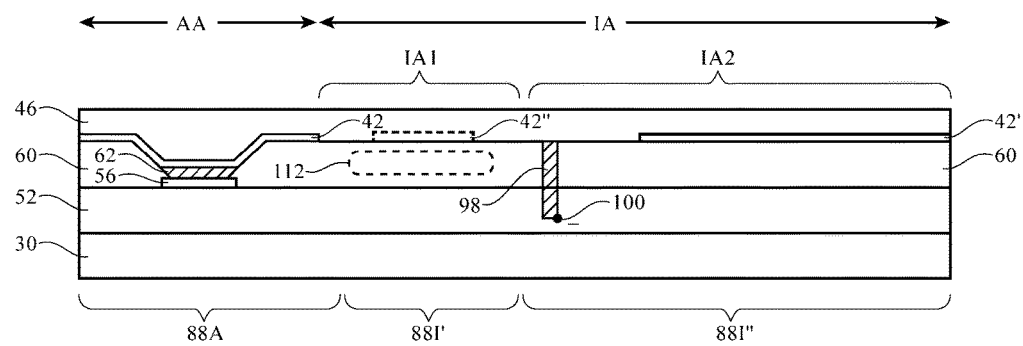

If desired, the structures in extended portions 88I' and 88I" may omit some or all of the dummy structures of FIG. 9. As shown in FIG. 10, for example, dummy cathode layer 42' may be formed on layer 60 without forming underlying dummy anodes 56'. Emissive layer material 62' may also be omitted from the displays of FIGS. 9 and 10, if desired.

Figure 11:
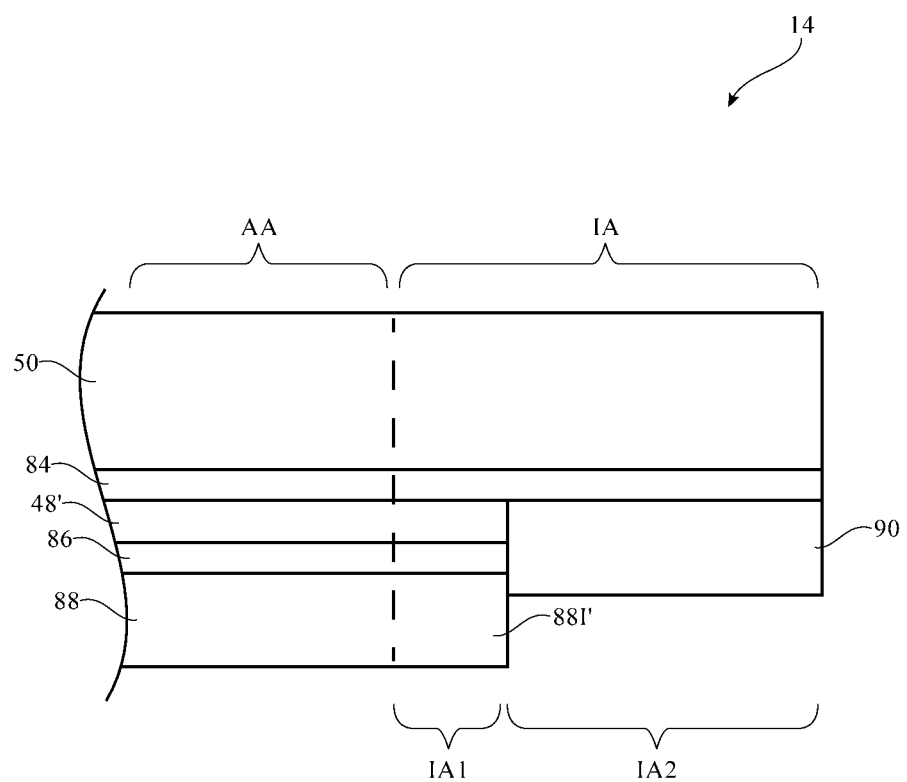
FIG. 11 is a cross-sectional side view of an illustrative display with a border in accordance with an embodiment.

As shown in FIG. 11, circular polarizer 48' need not extend to the outermost edge of display 14. In this type of configuration, structures 90 may be configured to take account of the absence of polarizer 48' above structures 90 while still ensuring that that appearance of structures 90 matches that of layer 88 in active area AA.

Figure 12:
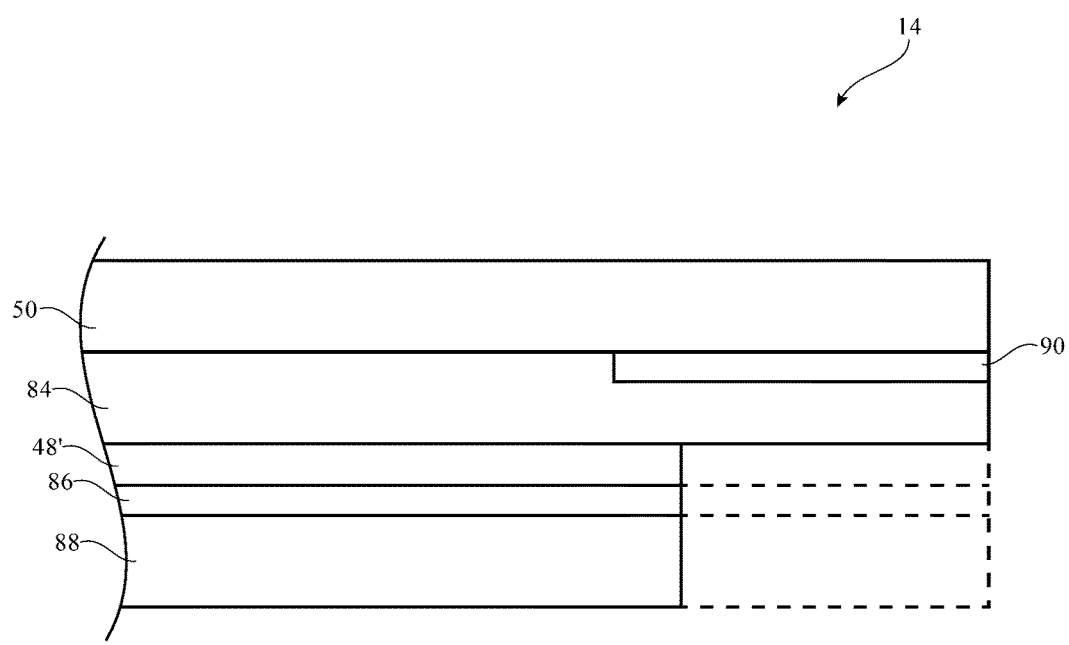
FIG. 12 is a cross-sectional side view of a display having an opaque border layer that overlaps an edge of an organic light-emitting diode display layer in accordance with an embodiment.

FIG. 12 is a cross-sectional side view of a portion of an illustrative display for device 10 showing how structures 90 may be deposited as coating layers on the lower surface of display cover layer 50. Polarizer layer 48' and display layer 88 may extend to the outer edge of display 14 and may therefore be aligned with the outer edge of structures 90 or polarizer 48' and/or display layer 88 may extend only partway to the outer edge of display 14.

Figure 13:
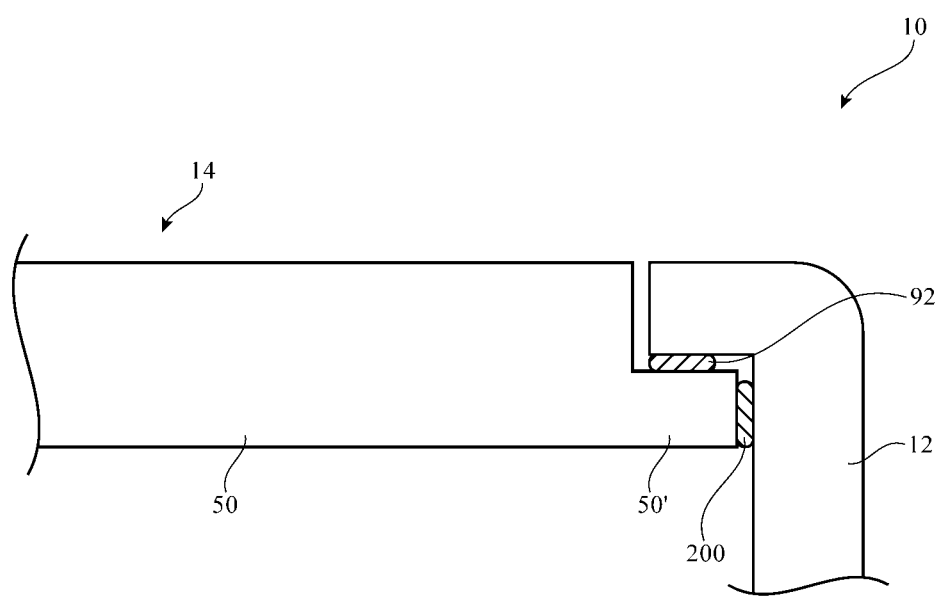
FIG. 13 is a cross-sectional side view of an illustrative device with a housing structure that helps retain a display in accordance with an embodiment.

FIG. 13 is a cross-sectional side view of an edge portion of device 10 in an illustrative configuration in which display cover layer 50 is held in place by a portion of housing 12. In the example of FIG. 13, display cover layer 50 has protruding portion 50'. Adhesive 92 may be used to secure portion 50' to housing 12. Elastomeric gasket structures such as illustrative gasket 200 may be interposed between display cover layer 50 and housing 12 to help seal display 14 to the front face of housing 12. Other configurations for securing display 14 within housing 12 may be used, if desired.

The foregoing is merely illustrative and various modifications can be made by those skilled in the art without departing from the scope and spirit of the described embodiments. The foregoing embodiments may be implemented individually or in any combination.

What is claimed is:

1. An electronic device having opposing front and rear faces, the electronic device comprising:
   a housing with edges;
   a polarizer layer that covers the front face and extends between the edges of the housing; and
   an organic light-emitting diode display that is covered by the polarizer and that has an active area with pixels that display images and an inactive area that does not display images, wherein the inactive area comprises:
   a first inactive area portion comprising dummy pixel structures, wherein the dummy pixel structures are free of organic emissive material; and
   a second inactive area portion from which the dummy pixel structures are absent.

2. The electronic device defined in claim 1, wherein the second inactive area portion is interposed between the active area and the first inactive area portion.

3. The electronic device defined in claim 1, wherein each of the pixels comprises an anode, a cathode, and a layer of organic emissive material.

4. The electronic device defined in claim 3, wherein each of the dummy pixel structures comprises a dummy anode.

5. The electronic device defined in claim 3, wherein each of the dummy pixel structures comprises a dummy cathode.

6. The electronic device defined in claim 1, wherein the active area is rectangular and the inactive area forms a border around the rectangular active area, and wherein the second inactive area portion is formed in the border.

7. The electronic device defined in claim 6, further comprising:
   a speaker port in the border formed by the inactive area.

8. The electronic device defined in claim 7, further comprising:
   a touch sensor layer that overlaps the active area, the first inactive area portion, and the second inactive area portion.

9. The electronic device defined in claim 4, wherein each of the dummy pixel structures does not include a cathode.

10. An electronic device comprising:
    an organic light-emitting diode display comprising:
    an active area with pixels that emit light, wherein each of the pixels comprises an anode, a cathode, and a layer of emissive material;
    a first inactive area portion with dummy pixel structures that do not emit light, wherein each of the dummy pixel structures comprises a dummy anode; and
    a second inactive area portion that does not emit light and that is free of dummy anodes; and
    a polarizer layer that overlaps the active area and the first inactive area portion.

11. The electronic device defined in claim 10, wherein each of the dummy pixel structures comprises a layer of dummy emissive material.

12. The electronic device defined in claim 11, wherein each of the dummy pixel structures comprises a dummy cathode.

13. The electronic device defined in claim 10, wherein each of the dummy pixel structures is free of dummy emissive material and dummy cathodes.

14. The electronic device defined in claim 10, wherein the second inactive area portion is free of dummy emissive material and dummy cathodes.

15. The electronic device defined in claim 14, wherein the second inactive area portion is interposed between the first inactive area portion and the active area.

16. An electronic device comprising:
a polarizer layer; and
an organic light-emitting diode display that is covered by the polarizer layer, wherein the organic light-emitting diode display comprises:
   an active area that displays images, the active area comprising light-emitting pixels;
   a first inactive area portion that does not display images, the first inactive area portion comprising dummy pixels that do not emit light; and
   a second inactive area portion that does not display images, wherein the second inactive area portion is free of dummy pixels and is interposed between the first inactive area portion and the active area.

17. The electronic device defined in claim 16, wherein the polarizer layer overlaps the active area and the first inactive area portion.

18. The electronic device defined in claim 17, further comprising:
   a touch sensor layer that overlaps the active area, the first inactive area portion, and the second inactive area portion.

19. The electronic device defined in claim 18, further comprising:
   a display cover layer that overlaps the active area, the first inactive area portion, and the second inactive area portion.

20. The electronic device defined in claim 16, wherein the dummy pixels are shorted to ground.

21. The electronic device defined in claim 16, wherein the light-emitting pixels comprise anodes, cathodes, and light-emitting material, and wherein the dummy pixels comprise dummy anodes.

* * * * *